United States Patent
Sethi et al.

(10) Patent No.: US 12,429,933 B2
(45) Date of Patent: Sep. 30, 2025

(54) MANAGEMENT OF DEVICE BASED ON CPU TEMPERATURE DURING HIBERNATION STATE

(71) Applicant: Dell Products L.P., Round Rock, TX (US)

(72) Inventors: Parminder Singh Sethi, Ludhiana (IN); Veena Ramarao, Bangalore (IN); Pandiyarajan Mani, Gudiyattam (IN)

(73) Assignee: Dell Products L.P., Round Rock, TX (US)

( * ) Notice: Subject to any disclaimer, the term of this patent is extended or adjusted under 35 U.S.C. 154(b) by 278 days.

(21) Appl. No.: 18/113,691

(22) Filed: Feb. 24, 2023

(65) Prior Publication Data
US 2024/0288916 A1 Aug. 29, 2024

(51) Int. Cl.
*G06F 1/20* (2006.01)
*G06F 1/3206* (2019.01)
*G06F 1/3234* (2019.01)

(52) U.S. Cl.
CPC ............ *G06F 1/206* (2013.01); *G06F 1/3206* (2013.01); *G06F 1/3243* (2013.01)

(58) Field of Classification Search
CPC ....................................................... G06F 1/206
See application file for complete search history.

(56) References Cited

U.S. PATENT DOCUMENTS

| | | | |
|---|---|---|---|
| 11,017,823 B1* | 5/2021 | Kamepalli | G06F 1/206 |
| 2013/0103900 A1* | 4/2013 | Chiu | G06F 11/3058 |
| | | | 711/112 |
| 2013/0166932 A1* | 6/2013 | Iarovici | G06F 1/3275 |
| | | | 713/323 |
| 2013/0275991 A1* | 10/2013 | Boegard | G06F 1/206 |
| | | | 702/132 |
| 2014/0195657 A1* | 7/2014 | Bhatia | H04L 61/5038 |
| | | | 709/223 |
| 2019/0121409 A1* | 4/2019 | Wu | G06F 21/35 |
| 2021/0303432 A1* | 9/2021 | Chang | G06F 11/004 |

OTHER PUBLICATIONS

Intel, "What Is Clock Speed?" https://www.intel.com/content/www/us/en/gaming/resources/cpu-clock-speed.html, Accessed Feb. 9, 2023, 6 pages.

(Continued)

*Primary Examiner* — Suresh Suryawanshi
(74) *Attorney, Agent, or Firm* — Ryan, Mason & Lewis, LLP

(57) ABSTRACT

A method comprises analyzing operational data corresponding to at least one processing unit of a device, and deriving a threshold processing unit temperature for initiation of a hibernation state of the device based at least in part on the analyzing. In the method, the temperature of the at least one processing unit is monitored, and a determination is made whether the temperature of the at least one processing unit has reached the threshold processing unit temperature. The hibernation state of the device is initiated responsive to determining that the temperature of the at least one processing unit has reached the threshold processing unit temperature. A command to initiate the hibernation state is transmitted over an out-of-band communication channel.

20 Claims, 11 Drawing Sheets

(56) References Cited

OTHER PUBLICATIONS

Techtarget, "Baseboard Management Controller (BMC)" https://www.techtarget.com/searchnetworking/definition/ baseboard-management-controller#:~:text=A, Accessed Feb. 9, 2023, 3 pages.
S. Latvala et al., "Evaluation of Out-of-Band Channels for IoT Security," SN Computer Science, vol. 1, No. 18, Sep. 3, 2019, 17 pages.
W. Fischer, "Processor P-states and C-states," https://www.thomas-krenn.com/en/wiki/Processor_P-states_and_C-states, Jan. 7, 2019, 4 pages.

* cited by examiner

MANAGEMENT OF DEVICE BASED ON CPU TEMPERATURE DURING HIBERNATION STATE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to device state management in such information processing systems.

BACKGROUND

In a datacenter or other computing environment, device central processing unit (CPU) temperature may increase due to, for example, ambient cooling issues or other factors. Under current approaches, if the CPU temperature reaches a designated maximum threshold value, a device may attempt to reduce the temperature by scaling down the CPU frequency. However, if the CPU temperature does not decrease in response to scaling down the CPU frequency, the device powers off abruptly, resulting in unwanted loss of data.

SUMMARY

Embodiments provide a platform and techniques for device state management based on CPU temperature.

For example, in one embodiment, a method comprises analyzing operational data corresponding to at least one processing unit of a device, and deriving a threshold processing unit temperature for initiation of a hibernation state of the device based at least in part on the analyzing. In the method, the temperature of the at least one processing unit is monitored, and a determination is made whether the temperature of the at least one processing unit has reached the threshold processing unit temperature. The hibernation state of the device is initiated responsive to determining that the temperature of the at least one processing unit has reached the threshold processing unit temperature. A command to initiate the hibernation state is transmitted over an out-of-band communication channel.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

Figure 1:
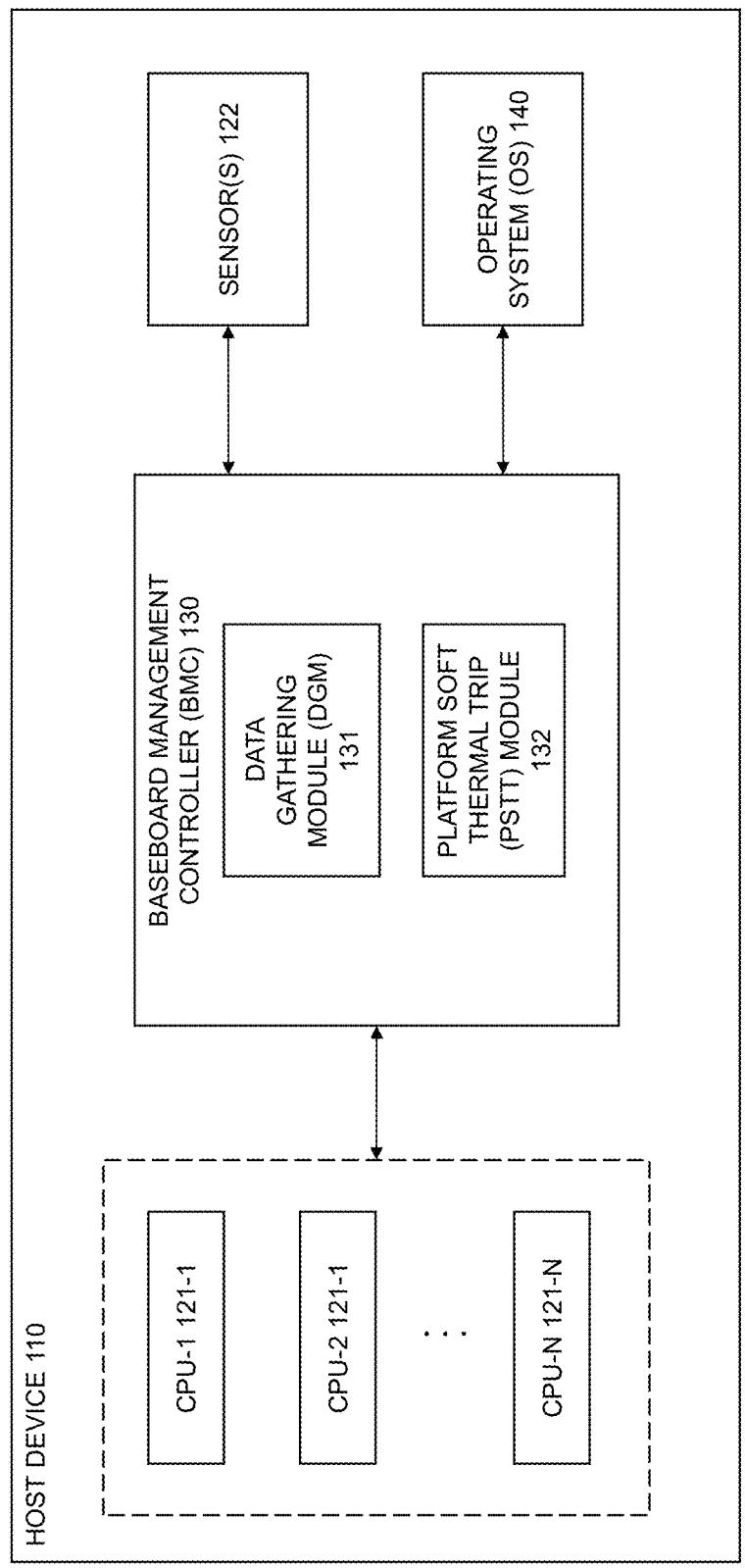
FIG. 1 depicts an information processing system comprising a host device including a platform for managing the state of the host device based on CPU temperature in an illustrative embodiment.

FIG. 1 depicts an information processing system 100 comprising a host device 110 including a platform for managing the state of the host device 110 based on CPU temperature. The platform comprises, but is not necessarily limited to, a baseboard management controller (BMC) 130 including a data gathering module (DGM) 131 and a platform soft thermal trip (PSTT) module 132. The host device 110 includes one or more CPUs, CPU-1 121-1, CPU-2 121-2, . . . , CPU-N (121-N) (collectively "CPUs 121"), one or more sensors 122 and an operating system (OS) 140. Although illustrative embodiments are discussed in terms of a CPU or CPUs, the embodiments are not necessarily limited thereto, and may apply to other "processing units" such as, for example, a graphical processing unit (GPU), a tensor processing unit (TPU), a video processing unit (VPU), a coprocessor, etc.

The temperature of the one or more CPUs 121 may increase due to, for example, ambient conditions and/or other factors (e.g., host device fan failure). In order to decrease the temperature, the CPU frequency (e.g., speed) may be reduced by modifying the CPU performance state (p-state). The p-state corresponds to an operating frequency of a CPU. The following table illustrates different example p-states and their corresponding CPU frequencies.

| P-State | CPU Frequency |
|---|---|
| P0 | 3.2 GHz |
| P1 | 2.4 GHz |
| P2 | 2.2 GHz |
| P3 | 2.0 GHz |
| P4 | 1.8 GHz |
| P5 | 1.4 GHz |
| P6 | 1.2 GHz |
| P7 | 1.0 GHz |
| P8 | 900 MHz |
| P9 | 800 MHz |
| P10 | 700 MHz |
| P11 | 600 MHz |

A CPU (e.g., a CPU 121) operates at maximum frequency in the P0 state and lowest frequency in the P11 state. Depending on CPU temperature, the CPU frequency may be controlled by modifying the p-state. For example, as noted above, in order to decrease the temperature, the CPU frequency may be reduced by modifying the CPU p-state (e.g., by increasing the p-state to one that corresponds to lower CPU frequency).

As noted above in the background section, if CPU temperature does not decrease in response to scaling down CPU frequency, a device may power off abruptly, resulting in unwanted loss of data. In an effort to address this issue and avoid unwanted loss of data, the illustrative embodiments provide a technical solution with techniques for the BMC 130 to place the host device 110 into a hibernation state by putting the OS 140 into the hibernation state instead of abruptly powering off the host device 110. Advantageously, once the temperature of the one or more CPUs 121 is restored to an operational value, the BMC 130 will automatically return the OS 140 to a fully active state (e.g., awaken the OS 140) from the hibernation state without any user intervention. As an additional advantage, host device data (e.g., application and OS data) will remain intact during the hibernation state.

As used herein, a "hibernated state," a "hibernation state" or an "S4 state" refers to a sleeping state of a device, where OS context is maintained by writing the OS context to memory (e.g., storage device) before entering the hibernation state so that upon returning to a higher state of activity (e.g., fully active (e.g., S0) state), a system is returned to the pre-hibernation location (OS context). In illustrative embodiments, OS context is maintained in a hibernate file (e.g., an image of memory) that the system writes to disk before entering the hibernation state.

In illustrative embodiments, the BMC 130 comprises a specialized processing device configured to monitor the physical state of the host device 110 and/or hardware of the host device 110 using, for example, one or more sensors 122. The sensors 122 measure, for example, CPU temperature, CPU frequency, power supply voltage, communications parameters and OS functions. In some embodiments, the BMC 130 is configured to communicate with one or more user devices over one or more networks. The networks comprise at least a portion of a global computer network such as the Internet, although other types of networks can be part of the networks, including a wide area network (WAN), a local area network (LAN), a satellite network, a telephone or cable network, a cellular network, a wireless network such as a WiFi or WiMAX network, or various portions or combinations of these and other types of networks. The networks comprise combinations of multiple different types of networks each comprising processing devices configured to communicate using Internet Protocol (IP) or other related communication protocols.

In a non-limiting illustrative example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The BMC 130 may be located in a motherboard or main circuit board of the host device 110. The BMC 130 may comprise a remote access controller such as, for example, an integrated Dell Remote Access Controller (iDRAC).

The host device 110 can comprise, for example, a desktop, laptop or tablet computer, server, storage device, mobile telephone, Internet of Things (IoT) device or other type of processing device. Such a device is an example of what is more generally referred to herein as a "processing device." Some of the processing devices are also generally referred to herein as "computers." The host device 110 may also or alternately comprise virtualized computing resources, such as virtual machines (VMs), containers, etc. The host device 110 in some embodiments comprises a computer associated with a particular company, organization or other enterprise. It is to be understood that although the embodiments are discussed in terms of a host device 110 (e.g., user, customer or client device), the embodiments are not necessarily limited thereto, and may be applied to different devices (e.g., edge or cloud devices).

The terms "user," "customer," "client" or "administrator" herein are intended to be broadly construed so as to encompass numerous arrangements of human, hardware, software or firmware entities, as well as combinations of such entities.

At least a portion of the available services and functionalities provided by the host device 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments. Although not explicitly shown in FIG. 1, one or more input-output devices such as keyboards, displays or other types of input-output devices may be used to support one or more user interfaces to the host device 110.

Figure 7:
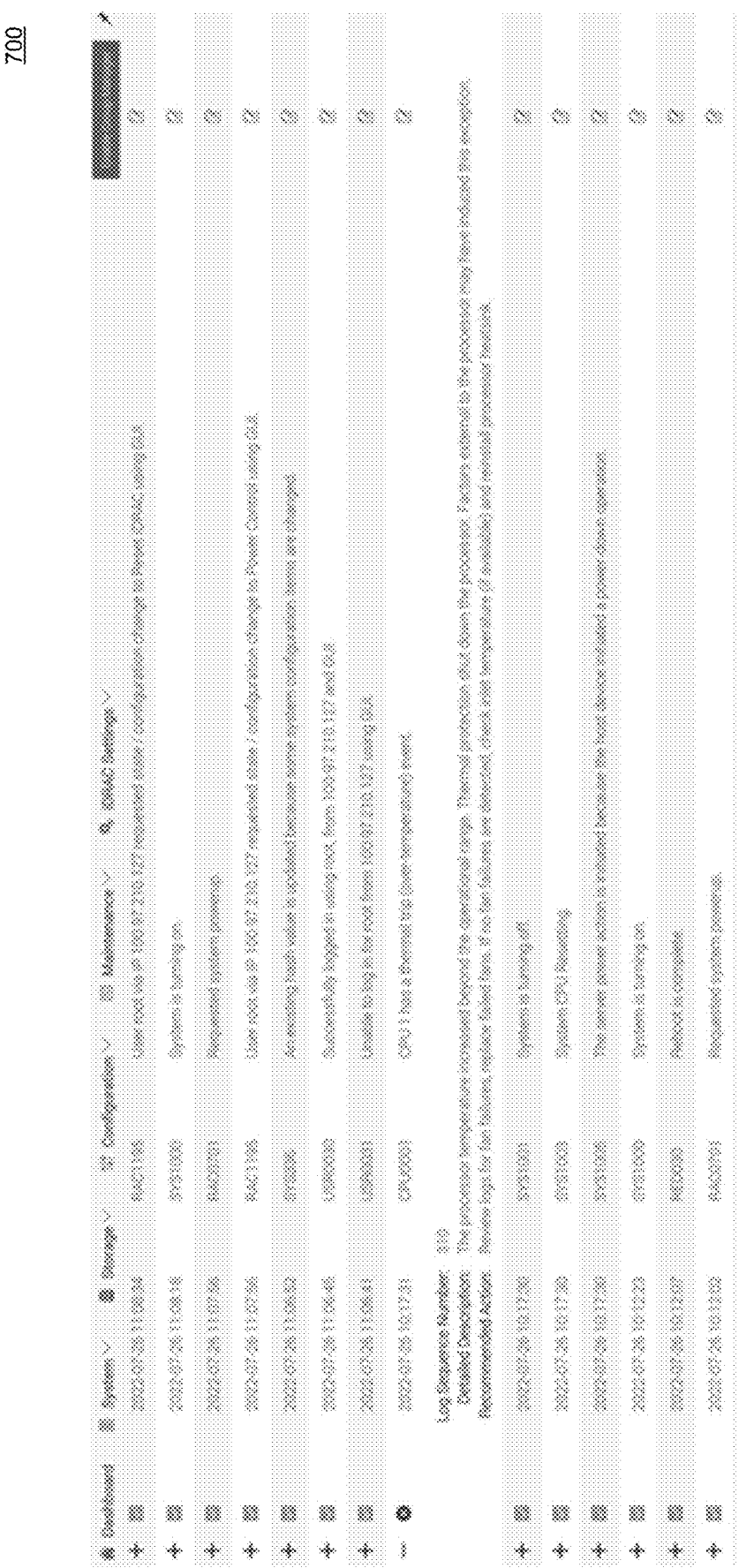
FIG. 7 depicts a user interface illustrating CPU temperature alert events in a lifecycle (LC) log in an illustrative embodiment.
Figure 8:
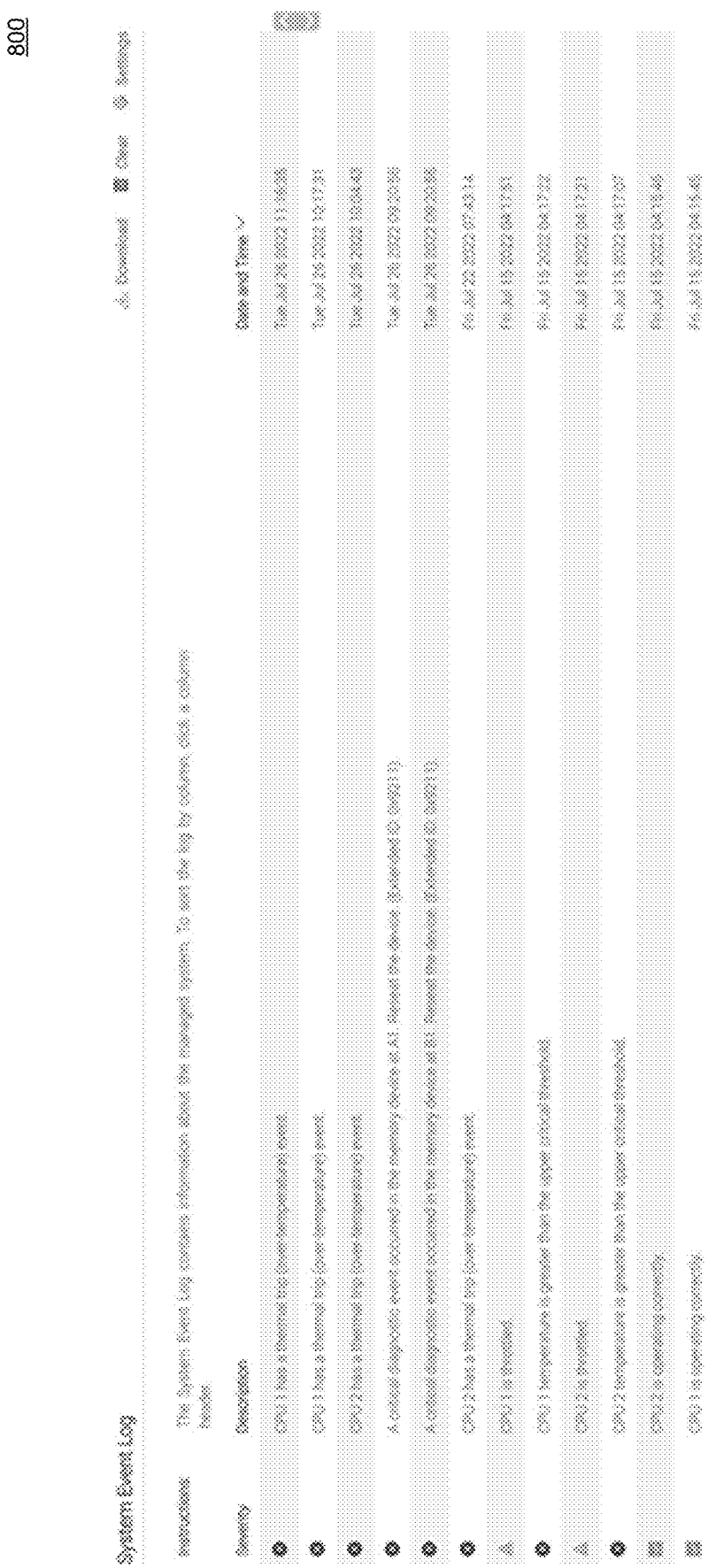
FIG. 8 depicts a user interface illustrating CPU temperature alert events in a system event log (SEL) in an illustrative embodiment.

The DGM 131 collects operational data corresponding to one or more CPUs 121 of the host device 110. The operational data comprises, for example, CPU temperature data, CPU p-state data, CPU throttling data and CPU frequency data. The operational data can be in the form of one or more logs, such as, for example, a lifecycle (LC) log and/or a system event log (SEL). FIG. 7 depicts a user interface 700 illustrating CPU temperature alert events in an LC log, and FIG. 8 depicts a user interface 800 illustrating CPU temperature alert events in an SEL.

Figure 4:
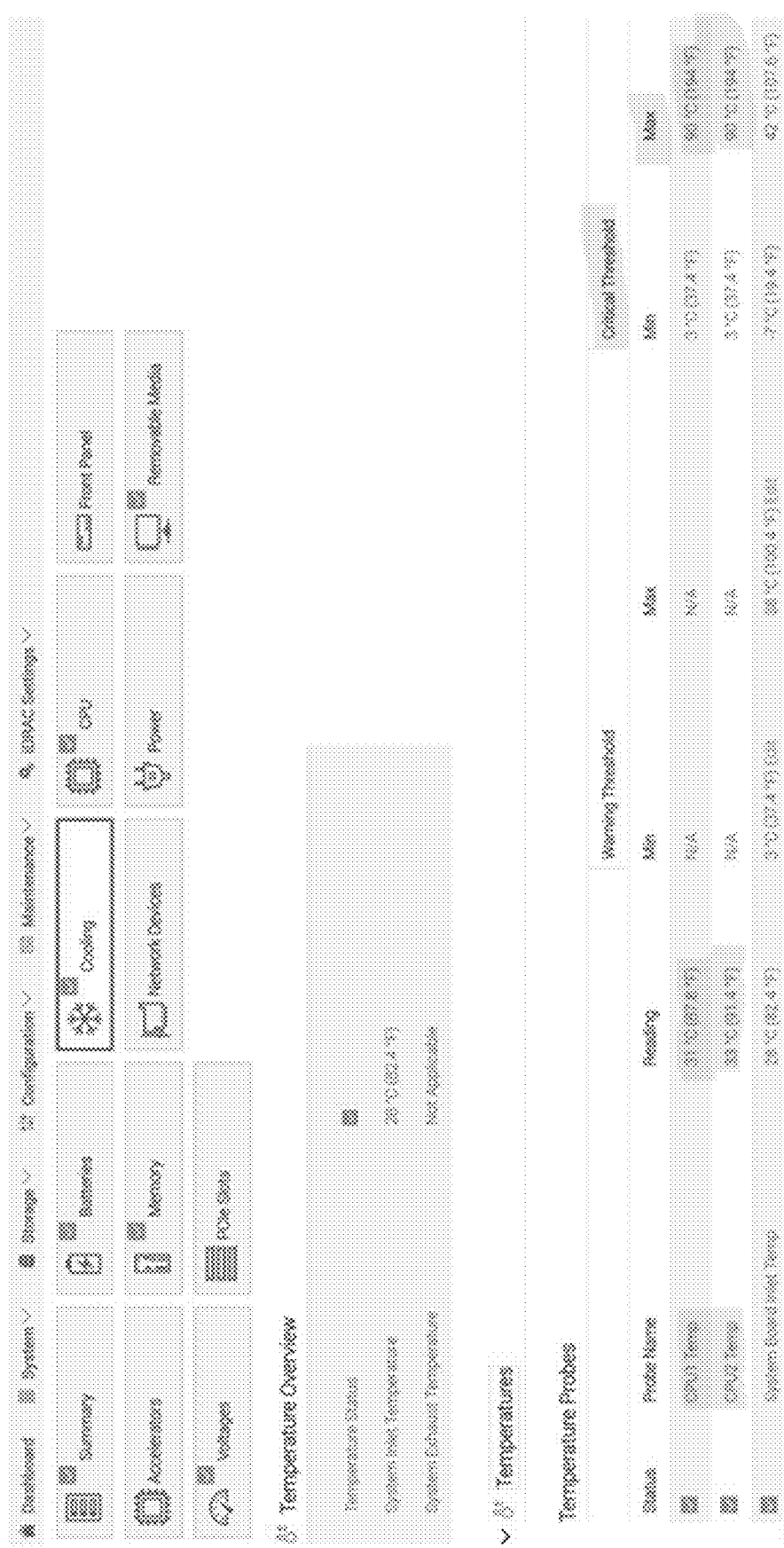
FIG. 4 depicts a user interface illustrating CPU temperature data in an illustrative embodiment.

The CPU temperature data comprises, for example, temperature readings of one or more CPUs 121 of the host device 110, and minimum and/or maximum threshold CPU temperatures for powering off the host device 110, such that when the thresholds are reached, the host device 110 will be powered off. Referring, for example, to the user interface 400 in FIG. 4, the temperature data includes temperature readings for two CPUs 121 (CPU1 and CPU2) and critical CPU temperature thresholds (e.g., minimum and maximum threshold CPU temperatures which would result in powering off the host device 110) for each CPU. The temperature data may also include system board inlet temperature readings, warning system board inlet temperature thresholds and critical system board inlet temperature thresholds. Similar to the critical CPU temperature thresholds, the critical system board inlet temperature thresholds include minimum and maximum threshold system board inlet temperatures which would result in powering off the host device 110. The warning system board inlet temperature thresholds include minimum and maximum threshold system board inlet temperatures which would result in warnings being generated and transmitted to one or more user devices over one or more networks.

Figure 5:
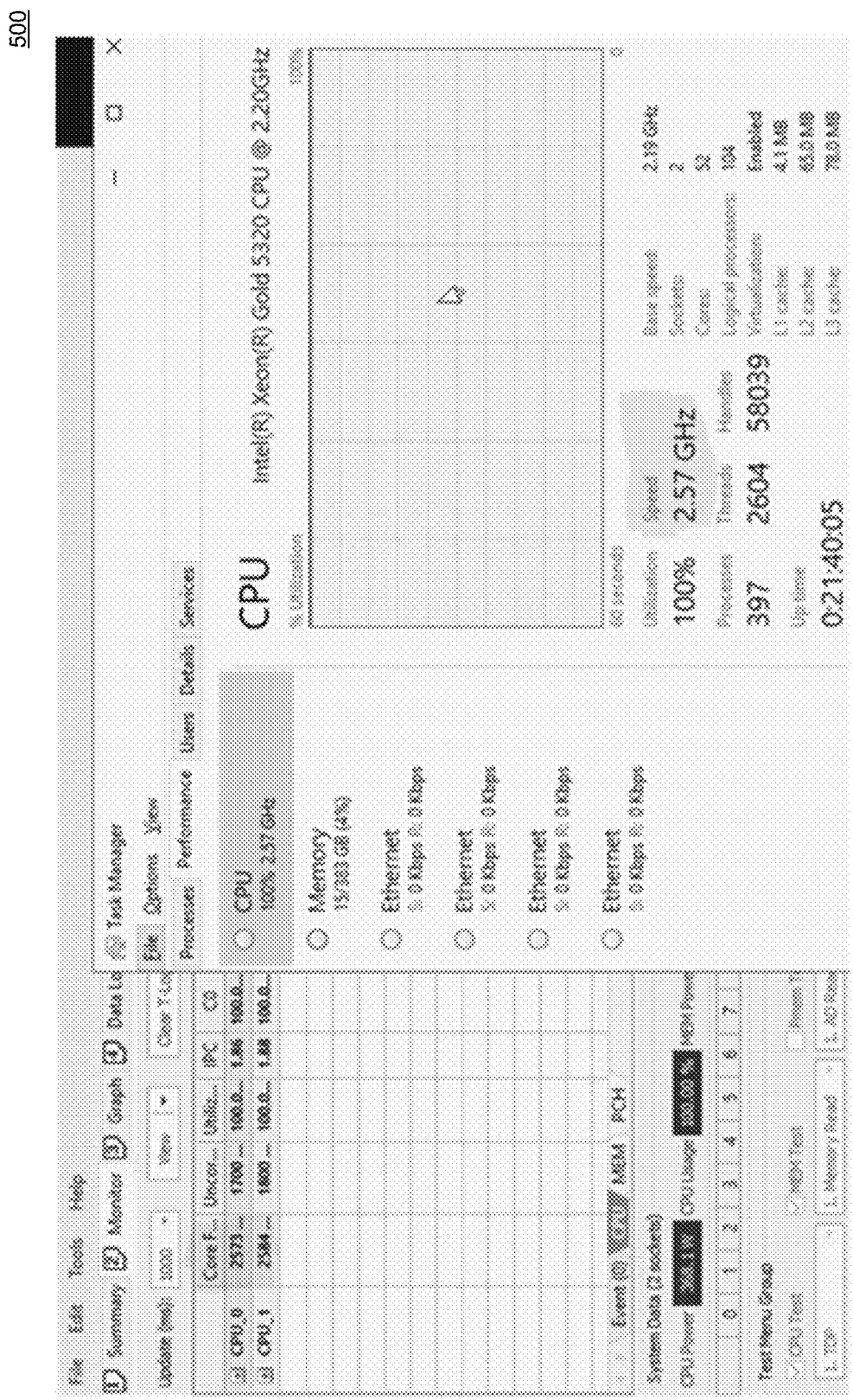
FIG. 5 depicts a user interface illustrating CPU frequency before CPU throttling in an illustrative embodiment.
Figure 6:
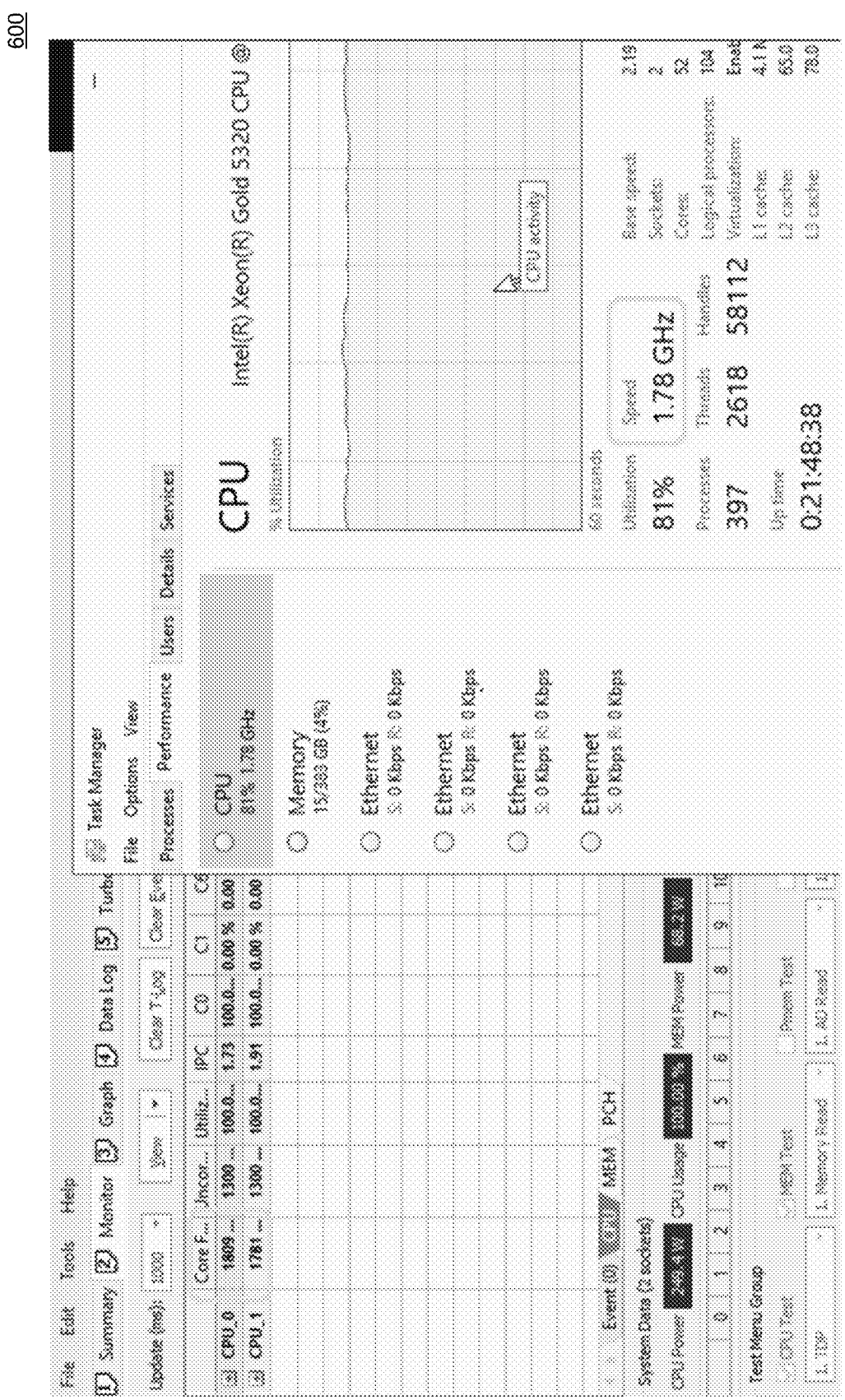
FIG. 6 depicts a user interface illustrating CPU frequency during CPU throttling in an illustrative embodiment.

Referring to the user interfaces 500 and 600 in FIGS. 5 and 6, CPU frequency data is captured before and during CPU throttling. As can be seen in FIG. 5, the utilization of the CPU is 100% and the CPU frequency is 2.57 GHz. As can be seen in FIG. 6, the utilization of the CPU is throttled to 81% and the CPU frequency is 1.78 GHz.

Figure 2:
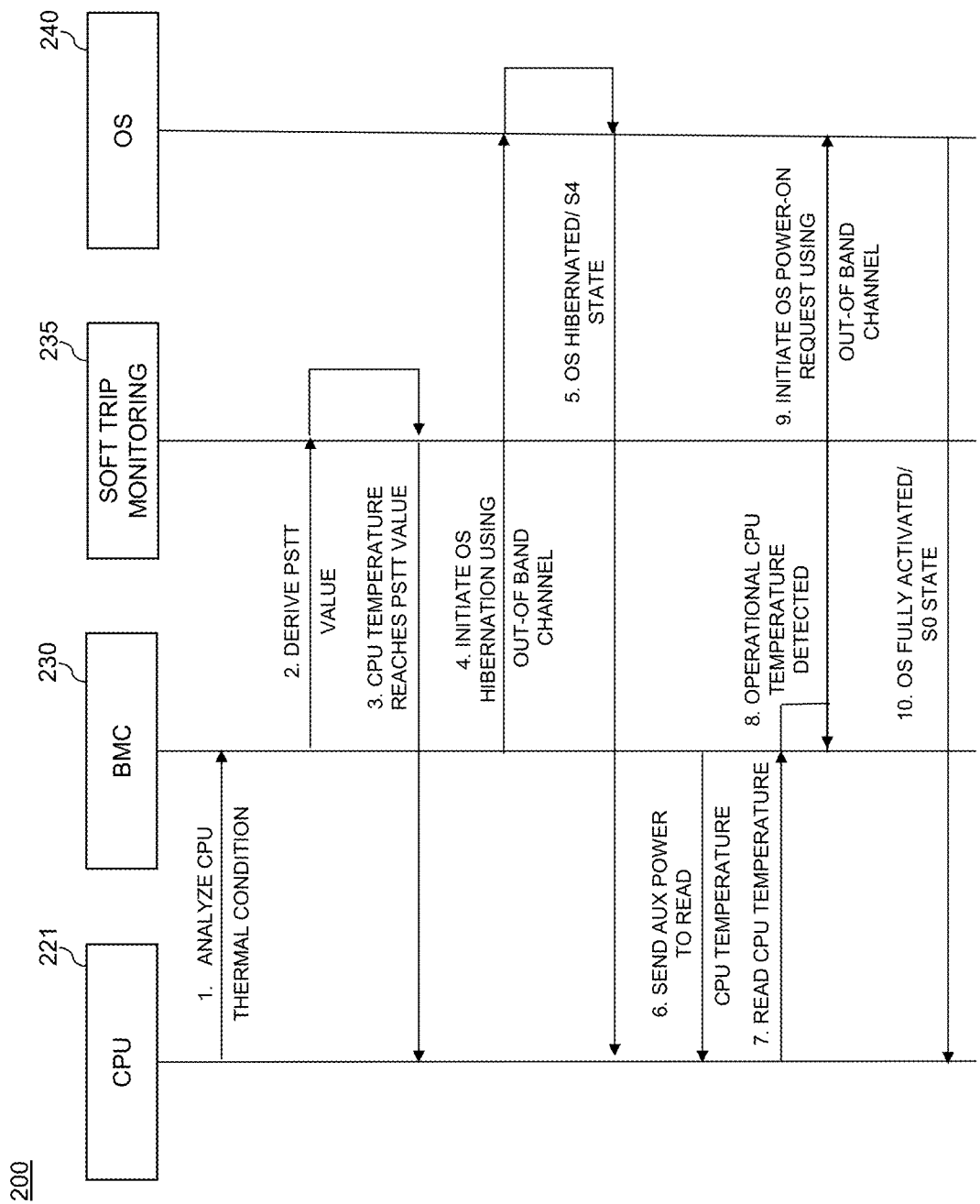
FIG. 2 depicts an operational flow diagram illustrating device state management based on CPU temperature in an illustrative embodiment.

Referring to FIGS. 1 and 2, the PSTT module 132 analyzes the operational data corresponding to at least one CPU 121 of the host device 110 to derive a threshold CPU temperature for initiation of a hibernation state of the host device 110. This threshold temperature (also referred to herein as a platform soft thermal trip (PSTT) value) is less than an existing maximum threshold value for CPU temperature which would result in powering off the host device 110. In some embodiments, additionally, in the case of extreme cooling events, the soft thermal trip value may also be greater than an existing minimum threshold value for CPU temperature which would result in powering off the host device 110. As shown at steps 1 and 2 in the operational flow diagram 200 in FIG. 2, based on the collected operational data, the BMC 230 (which is the same or similar to the BMC 130) analyzes the thermal condition of a CPU 221 (which is the same or similar to one of CPUs 121), and derives the PSTT value. In illustrative embodiments, the operational data of multiple CPUs 121 is collected by the DGM 131 and analyzed by the PSTT module 132 to derive respective PSTT values for respective ones of the multiple CPUs 121. The PSTT value(s) is maintained by the PSTT module 132 in, for example, a database or cache.

Referring to the operational flow diagram 200 in FIG. 2, the PSTT module 132 performs soft trip monitoring 235 to monitor the temperature of the CPU 221 to determine whether the temperature of the CPU 221 reaches the derived PSTT value. In some cases, the monitoring can be of more than one CPU of the host device 110 to determine whether the temperature of a given CPU reaches a corresponding PSTT value for the given CPU. In one or more embodiments, the PSTT module 132 continuously monitors CPU temperature in real-time to determine if the CPU temperature of one or more CPUs 121/221 reaches the derived threshold CPU temperature for initiation of a hibernation state of a host device (e.g., host device 110). As explained in more detail herein, the monitoring is performed using an in-band communication channel.

At steps 3 and 4 in the operational flow diagram 200, when the CPU temperature of one or more CPUs 121/221 reaches the derived PSTT value, the BMC 230 (or 130) will trigger a hibernation state of the host device 110 (e.g., hibernation of the OS 240 (or 140)). A command to initiate the hibernation state is transmitted over an out-of-band communication channel from the BMC 230 (or 130) to the OS 240 (or 140). For example, referring to the block diagram 300 in FIG. 3, a BMC 330 (which is the same or similar to BMC 130/230) collects operational data as described herein above and monitors the physical states (e.g., CPU temperature) of host device hardware 320 (e.g., CPUs 121/221) using an in-band communication channel, and transmits a command to initiate a hibernation state to an OS 340 (which is the same or similar to OS 140/240) over an out-of-band communication channel. As used herein, "in-band communication" refers to, for example, communication between a BMC 130/230/330 and host device hardware 320 using, for example, Intelligent Platform Management Interface (IPMI) commands or other protocols. As used herein, "out-of-band communication" refers to, for example, communication between a BMC 130/230/330 and an OS 140/240/340 using, for example, an OS passthrough channel such as, for example, SupportAssist Enterprise available from Dell Technologies, a universal serial bus-network interface controller (USB-NIC), and/or an intelligent shelf manager (ISM).

The command to place the OS 140/240/340 in the hibernation state differs depending on the OS. For example, in accordance with illustrative embodiments, example commands to place a Windows OS into a hibernation state are "powercfg-h on" and "shutdown/h", and an example command to place a Linux OS into a hibernation state is "/Desktop$ systemctl hibernate".

Referring to steps 5, 6 and 7 of the operational flow diagram 200, during the hibernation state, the BMC 130/230/330 will apply a minimum auxiliary (AUX) power to the CPU 121/221 and maintain the CPU 121/221 in a reset mode to continuously read the CPU temperature during the hibernation state. As a result, the system will not need to boot up completely to determine whether the CPU temperature has decreased to an operational temperature (e.g., below the PSTT value) where the OS 140/240/340 can be transitioned (e.g., woken up) to a higher state of activity (e.g., fully active (e.g., S0) state). Such monitoring and reading of the CPU temperature during the hibernation state is performed over an in-band communication channel as described herein.

Referring to steps 8 and 9 of the operational flow diagram 200, once the PSTT module 132 detects an operational CPU temperature (e.g., determines that the temperature of the CPU 121/221 is below the PSTT value), the BMC 130/230/ 330 initiates a power-on request to the OS 140/240/340 using an out-of-band channel to reactivate the device from the hibernation state. Referring to step 10 in the operational flow diagram 200, once the OS 140/240/340 is restored to a higher state of activity (e.g., fully active (e.g., S0) state), the OS 140/240/340 is returned to the pre-hibernation location (OS context) and no OS data is lost. In the case of multiple CPUs 121, the BMC 130/230/330 may initiate a power-on request once the PSTT module 132 determines that the temperature of each of the CPUs 121 or a threshold number of the CPUs 121 is below its corresponding PSTT value.

In illustrative embodiments, the power-on request comprises a command issued by the BMC 130/230/330 to restore the OS 140/240/340 to the fully active state, wherein the command is transmitted from the BMC 130/230/330 to the OS 140/240/340 over the out-of-band channel using, for example, an OS passthrough channel such as, for example, SupportAssist Enterprise, a USB-NIC, and/or an ISM.

According to one or more embodiments, databases, caches and other data repositories referred to herein can be configured according to a relational database management system (RDBMS) (e.g., PostgreSQL). In some embodiments, databases, caches and other data repositories referred to herein are implemented using one or more storage systems or devices associated with the platform for managing the state of a host device based on CPU temperature comprising the BMC 130/230/330. In some embodiments, one or more of the storage systems utilized to implement databases, caches and other data repositories referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Figure 3:
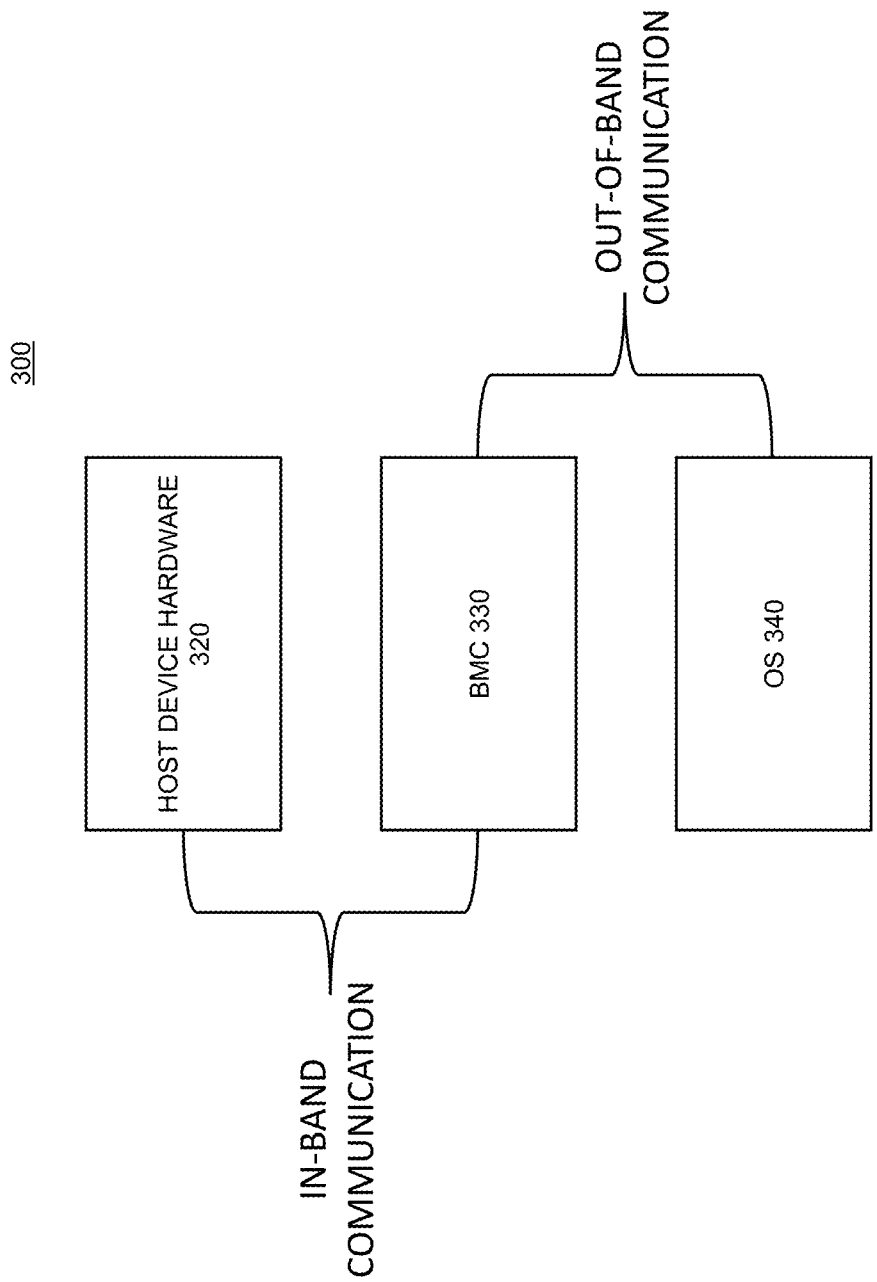
FIG. 3 depicts a block diagram illustrating in-band and out-of-band communication in an illustrative embodiment.

The BMCs 130/230/330 in the embodiments of FIGS. 1, 2 and 3 are each assumed to be implemented using at least one processing device. Each such processing device generally comprises at least one processor and an associated memory, and implements one or more functional modules for controlling certain features of the BMCs 130/230/330.

At least portions of the platform for managing the state of a host device comprising the BMC 130/230/330 and the elements thereof may be implemented at least in part in the form of software that is stored in memory and executed by a processor. The platform for managing the state of a host device comprising the BMC 130/230/330 and the elements thereof comprise further hardware and software required for running the platform for managing the state of a host device comprising the BMC 130/230/330, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

It is assumed that the platform for managing the state of a host device comprising the BMC 130/230/330 and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the platform for managing the state of a host device comprising the BMC 130/230/330, and the elements thereof can each be implemented in the form of one or more LXCs running on one or more VMs. Other arrangements of one or more processing devices of a processing platform can be used to implement the platform for managing the state of a host device comprising the BMC 130/230/330, as well as other elements of the platform for managing the state of a host device. Other portions of the system (e.g., system 100) can similarly be implemented using one or more processing devices of at least one processing platform.

It is to be appreciated that these and other features of illustrative embodiments are presented by way of example only, and should not be construed as limiting in any way. Accordingly, different numbers, types and arrangements of system elements such as the DGM 131, PSTT module 132 and other elements of the platform for managing the state of a host device comprising the BMC 130/230/330, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the platform for managing the state of a host device comprising the BMC 130/230/330 can be offered to cloud infrastructure customers or other users as part of FaaS, CaaS and/or PaaS offerings.

Figure 9:
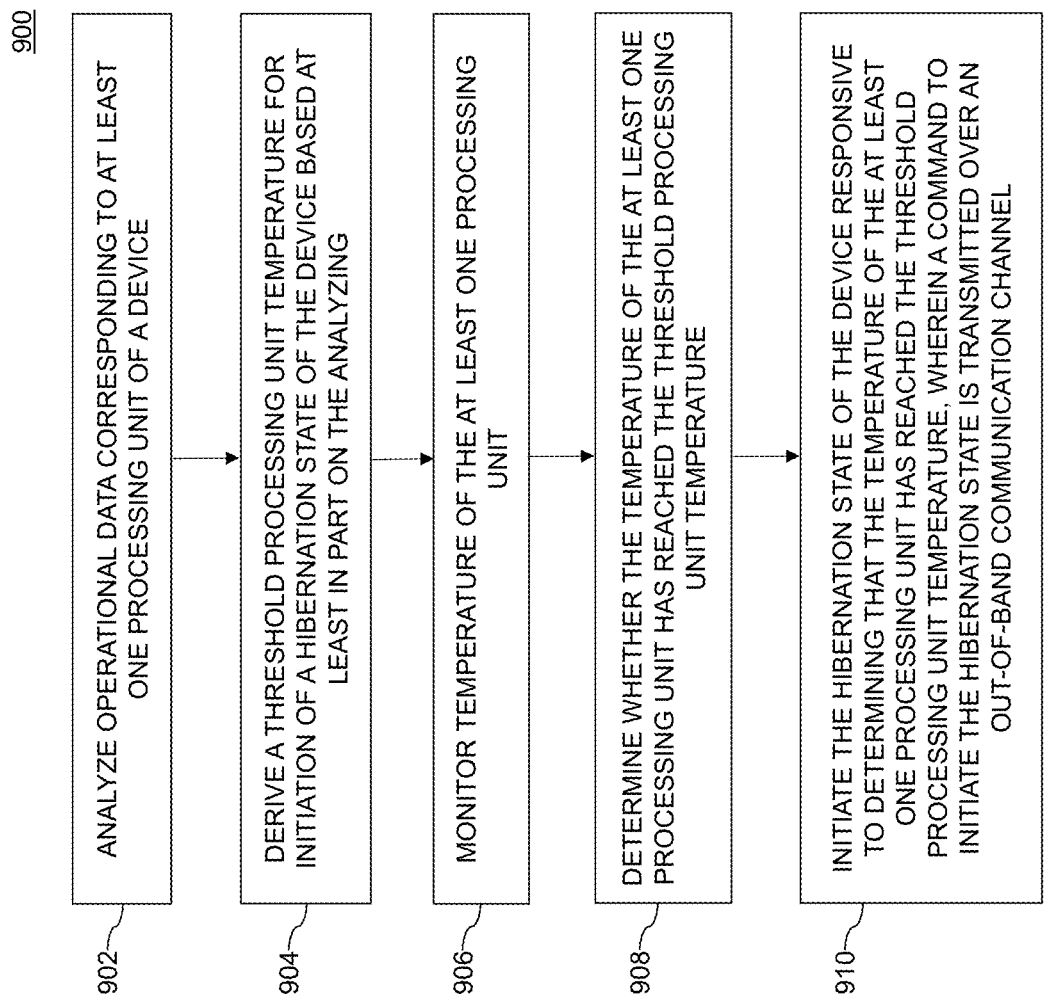
FIG. 9 depicts a process for device state management based on CPU temperature according to an illustrative embodiment.

The operation of the information processing system 100 will now be described in further detail with reference to the flow diagram of FIG. 9. With reference to FIG. 9, a process 900 for device state management based on CPU temperature as shown includes steps 902 through 910, and is suitable for use in the system 100 but is more generally applicable to other types of information processing systems comprising a platform for managing the state of a host device based on CPU temperature.

In step 902, operational data corresponding to at least one processing unit of a device is analyzed. The operational data comprises one or more of processing unit temperature data, processing unit p-state data, processing unit throttling data and processing unit frequency data. The processing unit temperature data comprises a threshold processing unit temperature for powering off the device. The operational data may be in one or more logs such as, for example, an LC log and/or an SEL.

In step 904, a threshold processing unit temperature for initiation of a hibernation state of the device is derived based at least in part on the analyzing. In step 906, temperature of the at least one processing unit is monitored. In step 908, a determination is made whether the temperature of the at least one processing unit has reached the threshold processing unit temperature.

In step 910, the hibernation state of the device is initiated responsive to determining that the temperature of the at least one processing unit has reached the threshold processing unit temperature. A command to initiate the hibernation state is transmitted over an out-of-band communication channel. As noted herein above, a processing unit may be, for example, a CPU, but is not necessarily limited thereto, and may include other processing units such as, for example, a GPU, a TPU, a VPU, a coprocessor, etc.

In illustrative embodiments, a BMC transmits the command to initiate the hibernation state to an OS of the device. The BMC monitors the temperature of the at least one processing unit over an in-band communication channel. The BMC may comprise a remote-access controller.

In illustrative embodiments, the process further includes reading the temperature of the at least one processing unit during the hibernation state, wherein the reading of the temperature is performed using an auxiliary power supply of the device. A determination is made whether the temperature of the at least one processing unit during the hibernation state is below the threshold processing unit temperature. A request to return the device to an active state from the hibernation state is generated responsive to determining that the temperature of the at least one processing unit during the hibernation state is below the threshold processing unit temperature. The request to return the device to the active state is transmitted over the out-of-band communication channel. For example, a BMC transmits the request to return the device to the active state to an OS of the device. At least OS data and application data of the device are maintained during the hibernation state.

It is to be appreciated that the FIG. 9 process and other features and functionality described above can be adapted for use with other types of information systems configured to manage the state of a host device based on CPU temperature in a state management platform or other type of platform.

The particular processing operations and other system functionality described in conjunction with the flow diagram of FIG. 9 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 9 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a platform for managing the state of a host device based on CPU temperature as disclosed herein can provide a number of significant advantages relative to conventional arrangements. For example, the embodiments provide a technical solution whereby a device can be placed into a hibernation state before CPU temperature reaches to thermal trip threshold temperature requiring a device to be powered off. As an additional advantage, following the hibernation state, the device can be automatically transitioned from the hibernation state to a fully active state when the CPU temperature is restored to an operational temperature value.

A BMC utilizes auxiliary power to detect the CPU temperature when in the hibernation state so that the device does not need to be powered on to monitor CPU temperature. As an additional advantage, the PSTT value for determining whether to enter a hibernation state is derived by analyzing real-time thermal data and CPU properties.

Unlike conventional techniques, the embodiments advantageously provide techniques for initiating a hibernation state and a restoration operation to an active state using an out-of-band communication channel to the OS. As a result, data is maintained during the hibernation state and fully restored when the device returns to an active state.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the platform for managing the state of a host device comprising the BMC 130/230/330 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a data packet conversion platform in illustrative embodiments. These and other cloud-based systems in illustrative embodiments can include object stores.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
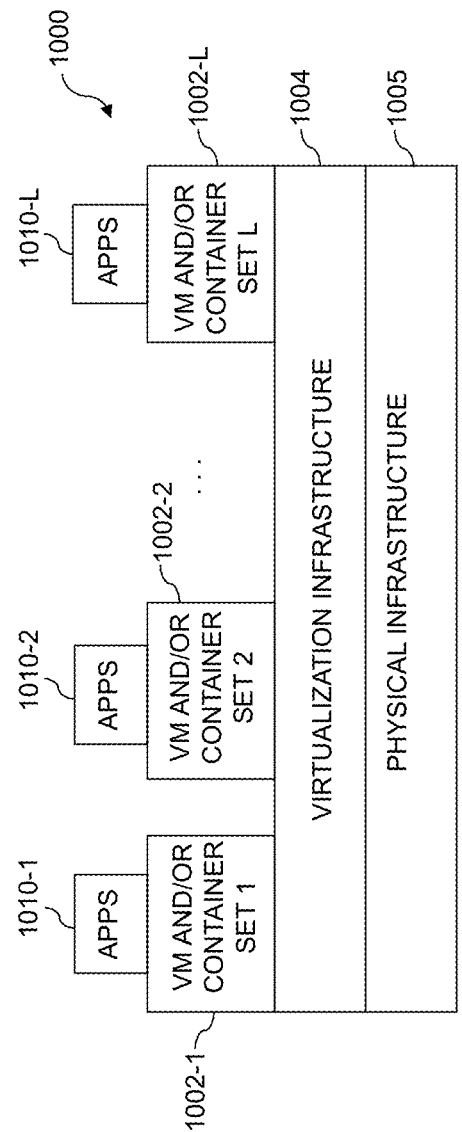
FIGS. 10 and 11 show examples of processing platforms that may be utilized to implement at least a portion of an information processing system according to illustrative embodiments.
Figure 11:
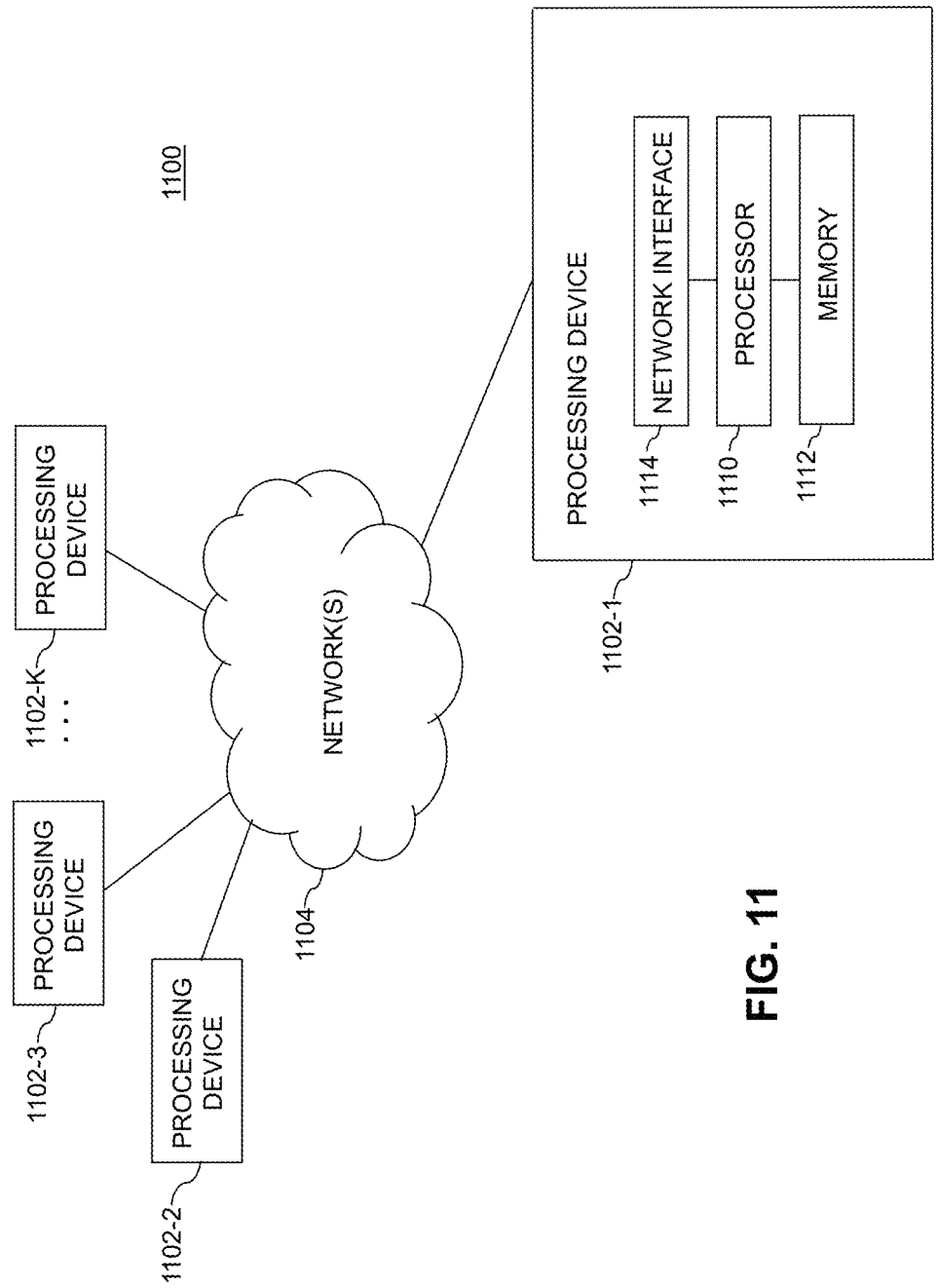

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112. The processor 1110 may comprise a microprocessor, a microcontroller, an application-specific integrated circuit (ASIC), a field-programmable gate array (FPGA), a CPU, a GPU, a TPU, a VPU or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the data packet conversion platform comprising the adapter 110/210 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and device state management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
analyzing operational data corresponding to at least one processing unit of a device;
deriving a threshold processing unit temperature for initiation of a hibernation state of the device based at least in part on the analyzing;
monitoring temperature of the at least one processing unit;
determining whether the temperature of the at least one processing unit has reached the threshold processing unit temperature;
initiating the hibernation state of the device responsive to determining that the temperature of the at least one processing unit has reached the threshold processing unit temperature, wherein a command to initiate the hibernation state is transmitted over an out-of-band communication channel; and
monitoring the temperature of the at least one processing unit during the hibernation state by applying a minimum auxiliary power to the at least one processing unit to read the temperature of the at least one processing unit;
wherein the steps of the method are executed by at least one processing device of the device operatively coupled to a memory of the device.

2. The method of claim 1 wherein the at least one processing device comprises a baseboard management controller, and the baseboard management controller transmits the command to initiate the hibernation state to an operating system of the device.

3. The method of claim 1 wherein the at least one processing device comprises a baseboard management controller, and the baseboard management controller monitors the temperature of the at least one processing unit over an in-band communication channel.

4. The method of claim 1 wherein the at least one processing device comprises a baseboard management controller, and the baseboard management controller comprises a remote-access controller.

5. The method of claim 1 wherein the operational data comprises one or more of processing unit temperature data, processing unit performance state data, processing unit throttling data and processing unit frequency data.

6. The method of claim 5 wherein the processing unit temperature data comprises a threshold processing unit temperature for powering off the device.

7. The method of claim 5 wherein the operational data is in one or more logs.

8. The method of claim 7 wherein the one or more logs comprise at least one of a lifecycle log and a system event log.

9. The method of claim 1 further comprising:
determining whether the temperature of the at least one processing unit during the hibernation state is below the threshold processing unit temperature; and
generating a request to return the device to an active state from the hibernation state responsive to determining that the temperature of the at least one processing unit during the hibernation state is below the threshold processing unit temperature.

10. The method of claim 9 wherein the request to return the device to the active state is transmitted over the out-of-band communication channel.

11. The method of claim 10 wherein the at least one processing device comprises a baseboard management controller, and the baseboard management controller transmits the request to return the device to the active state to an operating system of the device.

12. The method of claim 1 wherein at least operating system data and application data of the device are maintained during the hibernation state.

13. An apparatus comprising:
a processing device operatively coupled to a memory and configured:
to analyze operational data corresponding to at least one processing unit of a device;
to derive a threshold processing unit temperature for initiation of a hibernation state of the device based at least in part on the analyzing;
to monitor temperature of the at least one processing unit;
to determine whether the temperature of the at least one processing unit has reached the threshold processing unit temperature;
to initiate the hibernation state of the device responsive to determining that the temperature of the at least one processing unit has reached the threshold processing unit temperature, wherein a command to initiate the hibernation state is transmitted over an out-of-band communication channel; and
monitoring the temperature of the at least one processing unit during the hibernation state by applying a minimum auxiliary power to the at least one processing unit to read the temperature of the at least one processing unit.

14. The apparatus of claim 13 wherein the processing device is further configured:
to determine whether the temperature of the at least one processing unit during the hibernation state is below the threshold processing unit temperature; and
to generate a request to return the device to an active state from the hibernation state responsive to determining that the temperature of the at least one processing unit during the hibernation state is below the threshold processing unit temperature.

15. An article of manufacture comprising a non-transitory processor-readable storage medium having stored therein program code of one or more software programs, wherein the program code when executed by at least one processing device causes said at least one processing device to perform the steps of:
analyzing operational data corresponding to at least one processing unit of a device;
deriving a threshold processing unit temperature for initiation of a hibernation state of the device based at least in part on the analyzing;

monitoring temperature of the at least one processing unit;

determining whether the temperature of the at least one processing unit has reached the threshold processing unit temperature;

initiating the hibernation state of the device responsive to determining that the temperature of the at least one processing unit has reached the threshold processing unit temperature, wherein a command to initiate the hibernation state is transmitted over an out-of-band communication channel; and monitoring the temperature of the at least one processing unit during the hibernation state by applying a minimum auxiliary power to the at least one processing unit to read the temperature of the at least one processing unit.

16. The article of manufacture of claim 15 wherein the program code further causes said at least one processing device perform the steps of:

determining whether the temperature of the at least one processing unit during the hibernation state is below the threshold processing unit temperature; and generating a request to return the device to an active state from the hibernation state responsive to determining that the temperature of the at least one processing unit during the hibernation state is below the threshold processing unit temperature.

17. The apparatus of claim 13, wherein the operational data comprises one or more of processing unit temperature data, processing unit performance state data, processing unit throttling data and processing unit frequency data.

18. The apparatus of claim 17, wherein the processing unit temperature data comprises a threshold processing unit temperature for powering off the device.

19. The article of manufacture of claim 15, wherein the operational data comprises one or more of processing unit temperature data, processing unit performance state data, processing unit throttling data and processing unit frequency data.

20. The article of manufacture of claim 19, wherein the processing unit temperature data comprises a threshold processing unit temperature for powering off the device.

* * * * *